(12) United States Patent
Boustie et al.

(10) Patent No.: US 8,787,903 B2
(45) Date of Patent: Jul. 22, 2014

(54) HIGH CAPACITY HYBRID TERRESTRIAL/SATELLITE CELLULAR RADIO COMMUNICATION SYSTEM

(75) Inventors: Christelle Boustie, Lauzerville (FR); Gael Scot, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 83 days.

(21) Appl. No.: 13/696,800

(22) PCT Filed: May 5, 2011

(86) PCT No.: PCT/FR2011/051021
§ 371 (c)(1),
(2), (4) Date: Feb. 19, 2013

(87) PCT Pub. No.: WO2011/138563
PCT Pub. Date: Nov. 10, 2011

(65) Prior Publication Data
US 2013/0210424 A1    Aug. 15, 2013

(30) Foreign Application Priority Data

May 7, 2010    (FR) ...................................... 10 53589

(51) Int. Cl.
| | | |
|---|---|---|
| H04W 4/00 | (2009.01) | |
| H04B 7/185 | (2006.01) | |
| H04B 7/204 | (2006.01) | |
| H04W 84/06 | (2009.01) | |
| H04W 88/08 | (2009.01) | |
| H04W 16/28 | (2009.01) | |
| H04W 92/04 | (2009.01) | |

(52) U.S. Cl.
CPC .......... *H04B 7/18563* (2013.01); *H04B 7/2041* (2013.01); *H04W 84/06* (2013.01); *H04W 88/08* (2013.01); *H04W 16/28* (2013.01); *H04W 92/04* (2013.01)

USPC ........................... 455/427; 455/429; 455/430

(58) Field of Classification Search
CPC ..................................................... H04W 88/08
See application file for complete search history.

(56) References Cited

U.S. PATENT DOCUMENTS

| | | | |
|---|---|---|---|
| 5,697,050 | A | 12/1997 | Wiedeman |
| 6,052,586 | A | 4/2000 | Karabinis |
| 7,136,654 | B1 * | 11/2006 | Hogberg et al. ............... 455/450 |
| 2003/0054760 | A1 | 3/2003 | Karabinis |
| 2005/0164701 | A1 | 7/2005 | Karabinis et al. |
| 2005/0260984 | A1 * | 11/2005 | Karabinis ...................... 455/428 |
| 2008/0123579 | A1 * | 5/2008 | Kozat et al. .................... 370/312 |
| 2008/0182572 | A1 * | 7/2008 | Tseytlin et al. ................ 455/427 |
| 2010/0214166 | A1 * | 8/2010 | Remondi et al. .......... 342/357.23 |

FOREIGN PATENT DOCUMENTS

| | | |
|---|---|---|
| EP | 0 762 254 A2 | 3/1997 |
| WO | 99/10994 A1 | 3/1999 |

* cited by examiner

*Primary Examiner* — Suhail Khan
(74) *Attorney, Agent, or Firm* — Davidson, Davidson & Kappel, LLC (57) ABSTRACT

A hybrid cellular radiocommunication system includes base stations defining terrestrial cells covered by satellite umbrella cells. The base stations are distributed so as to be distinguishable by the satellite cell according to a time-invariant distribution function, and the system includes a device for maintaining, permanently and in the same link direction, congruence of the coverage of each satellite cell with respect to coverage of the terrestrial cells associated with the base stations contained in the satellite cell, with coverage of a satellite cell being congruent with a predetermined terrestrial coverage set when the predetermined coverage set is included in the satellite coverage.

16 Claims, 5 Drawing Sheets

HIGH CAPACITY HYBRID TERRESTRIAL/SATELLITE CELLULAR RADIO COMMUNICATION SYSTEM

This invention relates to a hybrid cellular radiocommunication system integrating a satellite component into a high density terrestrial cellular network and intended to provide broadband mobile radiocommunication services.

BACKGROUND

Terrestrial mobile radiocommunication systems, namely the European system UMTS (Universal Mobile Telecommunication System), the development thereof HSPA (High Speed Packet Access), and the American system CDMA2000, as well as the developments thereof, are already operational and offer so-called third generation, or 3G, broadband services with up to 1 Mbits/s.

Standards for the new generation, so-called fourth generation or 4G, systems, such as LTE (Long Term Evolution 3GPP Technology) and WIMAX IEEE 802.16 (Worldwide Interoperability for Microwave Access), are under development and offer services at even higher rates. Deployment of such 4G systems is planned to start in 2010.

All of these third and fourth generation systems can additionally include a satellite-based spatial component intended to complete and cover, as so-called satellite umbrella cells, the coverage of much smaller terrestrial cells which form the terrestrial component and are deployed namely in urban areas where the high field level thereof ensures good quality service and where population density is sufficient for them to be cost-effective, so that they are compatible with the radio propagation conditions of the urban environment which are difficult for satellites.

In order to increase the capacity of such hybrid telecommunication systems, the gain provided by frequency reuse within a band of terrestrial frequencies allocated to the terrestrial component is increased by a decrease in size of the terrestrial cells.

Similarly, the size of the umbrella cells must be decreased so as to adapt the granularity of the set of umbrella cells to the granularity of the set of terrestrial cells included in the umbrella cell, and to increase the efficiency of frequency reuse operated within a satellite frequency band allocated to the satellite component.

Regardless of the fact that the allocated band of terrestrial frequencies and the allocated band of satellite frequencies can be identical, partially identical, or distinct, interferences between terrestrial cells and satellite umbrella cells will occur due to instability of positioning or shape of the satellite beam(s) at the origin of the umbrella cells with respect to the terrestrial cells, with positioning or shape instability having various causes such as the antennas' sensitivity to variations in temperature, or the imperfection of attitude control of the satellite platform.

SUMMARY OF THE INVENTION

The technical problem is to decrease interference between terrestrial cells and satellite umbrella cells in order to increase the overall capacity of the hybrid telecommunication system.

For this purpose, an object of the invention provides a hybrid cellular radiocommunication system comprising:
- a network of terrestrial base stations, interconnected together and linked to a terrestrial infrastructure, each adapted for transmitting on a forward downlink and/or receiving on a backward uplink service radiocommunication signals in an associated frequency sub-band, and each defining by the radio range thereof upward and/or downward coverage of a terrestrial radiocommunication cell,
- at least one communication satellite linked to the terrestrial infrastructure by at least one access station via a bidirectional junction link, and adapted for transmitting on a forward satellite downlink and/or receiving on a backward satellite uplink service radiocommunication signals distributed over the radiocommunication satellite beams, the satellite beams each being associated with a frequency band and each defining by the ground radio range thereof up and/or down satellite coverage of a satellite umbrella cell,
- a set of communication service terminals adapted for transmitting and/or receiving radiocommunication signals, and distributed over terrestrial cells and satellite cells,
- means for assigning transmission resources, each being defined by a frequency sub-band and/or a time slot and/or a code, to the base stations or satellite beams, with the sub-bands being determined with respect to a first frequency band allocated to the set of base stations and a second frequency band allocated to the satellite beams, characterized in that
the base stations are distributed so as to be distinguishable by satellite cell according to a time-invariant distribution function,
and the system includes means for maintaining, permanently and in the same link direction, congruence of the coverage of each satellite cell with respect to the coverage of the terrestrial cells associated with the base stations contained in said satellite cell, with the coverage of a satellite cell being congruent with a predetermined terrestrial coverage set when said predetermined coverage set is entirely included in the satellite coverage.

According to specific embodiments, the hybrid system may include one or several of the following characteristics:
- the same frequency band is shared by the base stations and the satellite;
- the corresponding satellite beam of each satellite cell has a characteristic aperture angle $\theta$ defined as the minimum aperture angle selected from the set of azimuth directions of the beam with respect to a transmission or reception phase plane of the satellite, and the minimum aperture angle $\theta$ of the corresponding beam of each satellite cell is less than an angle value between 0.5 degrees and several degrees, and the congruence maintaining means are adapted for maintaining a misalignment $\Delta\theta$ of the satellite beam at permanently less than 0.05 degrees;
- the orbit of the satellite is included in the group of geostationary orbits (GEO), highly elliptical orbits (HEO), namely of the Sycomores, Toundra, or Molnya type, and inclined geosynchronous orbits (IGSO);
- the congruence maintaining means include calibration terminals, distributed over the satellite cells and each having a satellite receiving antenna, with the satellite receiving antenna having a substantially omnidirectional radiation pattern at a solid angle, corresponding to the set of elevations observed while going through the satellite coverage set and depending on the type of orbit the satellite is following;
- each calibration terminal includes a radio power measuring means adapted for measuring the power of a downlink radio signal specific to calibration or power of a radiocommunication signal, with the resolution of the power measurement being less than 1 dB, and precision of the measurement being less than 5 dB, and a means for forwarding the measurements collected by the measuring means and positions of the calibration terminals in case they are not predetermined;

the congruence maintaining means include calibration terminals distributed over the satellite cells and each having a satellite transmitting antenna, with the satellite transmitting antenna having a substantially omnidirectional radiation pattern at a solid angle, corresponding to the set of elevations observed while going through the satellite coverage set and depending on the type of orbit the satellite is following, with each calibration terminal having a means for transmitting a radio signal on a satellite uplink specific to the calibration or of power-calibrated radiocommunication, and a measuring means located aboard the satellite or an access station, adapted for measuring the power of the calibration radio signal of each calibration terminal on the corresponding backward satellite uplink, with the resolution of the power measurement being less than 1 dB, and precision of the measurement being less than 5 dB, and a means for forwarding the measurements collected by the measuring means and the positions of the calibration terminals in case they are not predetermined;

the number of calibration terminals is greater than or equal to 50;

calibration terminals are arranged at a number of base stations the location of which is known exactly;

a number of calibration terminals are arranged on FEMTO repeaters intended to improve wave propagation inside buildings, each repeater being provided with a locating unit, the calibration terminal being adapted for transmitting the location thereof through the locating information provided by the locating unit;

calibration terminals are mobile communication service terminals including a locating means selected from the set consisting of the global positioning receivers via a satellite constellation, and the positioning information extracting means determined by a mobile terrestrial network, with the calibration terminal being adapted for transmitting the location thereof via locating information provided by the locating means;

the system includes a processing means adapted for receiving power measurement information associated with each calibration terminal and for determining from an expected ground radiation pattern a misalignment correcting angle common to all beams or a correction of the formation of the satellite beams, with the processing means being connected to the measuring means by communication link(s) among the links of an Internet-like ground network, the links of a terrestrial cellular network, and satellite links;

the precision of the estimate of the required correction depends both on the total number of calibration terminals in the set of satellite beams and/or the distribution of the calibration terminals by satellite beam, on the measurement precision of the power measuring means, the transmission and/or reception radiation patterns of the antennas of the calibration terminals;

the processing means is adapted for correcting the satellite beams by a local estimate for each beam, a sufficient number of calibration terminals being provided in each beam, or an overall estimate integrating all of the calibration terminals into a single radiation pattern merging several beams, an estimate being included in the group of the methods consisting of the least square method and correlation methods.

Also an object of the present invention provides a method for maintaining congruence of terrestrial cell coverage of a cellular radiocommunication network with satellite coverage serving as an umbrella, created by at least one satellite in a hybrid telecommunication system as described above, comprising the following steps:

measuring calibration radio signal power by calibration terminals operating as receivers on a forward downlink, or by measuring means located aboard a satellite or an access station on a backward uplink, and redirected to a processing means, estimating a correction required in terms of a misalignment angle at a satellite antenna supporting structure using a processing means, or in terms of gain/phase shift coefficients of radiating elements, from the power measurements collected in the step and from the time-invariant distribution function of the base stations in the satellite cells, the condition of congruence being met for each satellite cell if the coverage of each satellite cell contains the coverage set of the terrestrial cells associated with the base stations determined by the distribution function as being included within the satellite cell, and applying the correction estimated in the step to the correcting mechanism of the satellite beams.

BRIEF DESCRIPTION OF THE DRAWINGS

The invention will be better understood from reading the description of an embodiment below, given by way of example only and with reference to the drawings, where.

DETAILED DESCRIPTION

Figure 1:
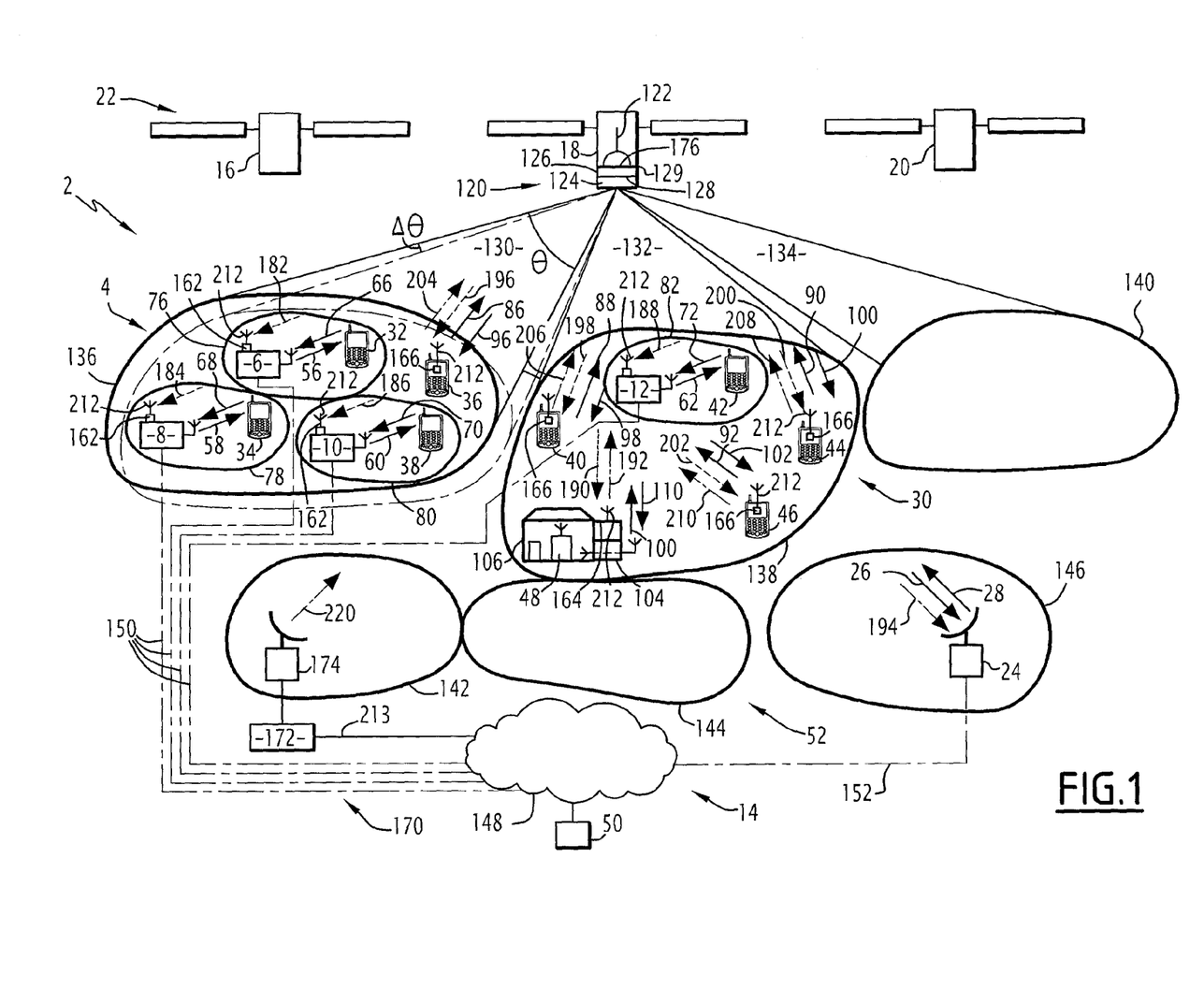
FIG. 1 is a view of a hybrid telecommunication system according to the present invention allowing for congruence to be maintained on the forward downlink of satellite beams with respect to the terrestrial cells.

According to FIG. 1, a hybrid telecommunication system 2 includes a network 4 of terrestrial base stations 6, 8, 10, 12 acting as radio relays, only four base stations being represented for clarity, a terrestrial infrastructure 14 interconnecting the base stations, one or several satellites, herein three satellites 16, 18, 20 forming a constellation 22 and acting as radio relays, and at least one access station 24 linking the satellites 16, 18, 20 to the terrestrial infrastructure 14 via a bidirectional access link consisting of a backward downlink 26 and a forward uplink 28.

The hybrid telecommunication system 2 also includes a set 30 of communication service terminals 32, 34, 36, 38, 40, 42, 44, 46, 48, only nine of which are represented by way of example, adapted for transmitting and/or receiving the radiocommunication signals, means 50 for assigning transmission resources to the base stations 6, 8, 10, 12, to the at least one satellite 16, 18, 20 and the service terminals 32, 34, 36, 38, 40, 42, 44, 46, and 48.

The hybrid telecommunication system 2 also includes coverage congruence maintaining means 52.

Each base station 6, 8, 10, 12 is adapted respectively for transmitting on a different associated forward terrestrial downlink 56, 58, 60, 62 and/or receiving on a different associated backward terrestrial uplink 66, 68, 70, 72 mobile service radiocommunication signals in a respective sub-band of associated frequencies, the sub-bands forming a first allocated band of terrestrial frequencies.

For each base station 6, 8, 10, 12, the associated forward terrestrial downlinks 56, 58, 60, 62, reduced to a single link for each station for simplification, and the associated backward terrestrial uplinks 66, 68, 70, 72 define by the radio range thereof respective coverage of a terrestrial radiocommunication cell 76, 78, 80, 82 associated with the base station.

Herein, it is assumed that for a given base station, both associated uplink and downlink coverage are identical.

According to FIG. 1, the service terminals 32, 34, 38, 42 are each located in a distinct respective terrestrial cell 76, 78, 80, 82 being relayed by a corresponding base station 6, 8, 10, 12.

The service terminals 32, 34, 38, 42 are each adapted according to a terrestrial mode for transmitting to and/or receiving from the base station 6, 8, 10, 12 in radio range to which they belong, radiocommunication signals on a backward uplink 56, 58, 60, 62 and/or a forward downlink 66, 68, 70, 72.

The terrestrial transmission mode is preferred namely in an urban environment where conditions of radio propagation are difficult. However, the terminals located in terrestrial cells can still communicate with a satellite.

Herein, by way of example, the communication service terminals 36, 40, 44, 46 are located out of radio range of any base station, e.g. due to the fact that they are located in a desert or scarcely populated geographical area, which for cost-saving reasons did not justify the deployment of a terrestrial base station in this area, with satellites being supposed to act as communication relays for the service terminals located in said area.

The communication service terminals 36, 40, 44, 46 are each capable according to a satellite mode of autonomously transmitting to and/or receiving from the satellite in line of sight and having the best elevation for the terminals, here satellite 18 in FIG. 1, radiocommunication signals on an associated backward uplink 86, 88, 90, 92 and/or an associated forward downlink 96, 98, 100, 102.

Here, the communication service terminal 48 is located out of range of a base station linked to the terrestrial infrastructure but in range of a building repeater 104 defining by the radio range thereof what is known as a FEMTO-type cell 106. A FEMTO-type cell, also designated as a "femto cell", conventionally is a very small-sized cell, which accounts for the prefix "femto", corresponding to the size of a family home. It enables an operator to offer a subscriber some additional coverage based on a personal installation generally connected to the Internet via a broadband wire link. The building repeater 104, as such out of range of any terrestrial base station, for similar reasons as those described above for a terminal operating in satellite mode 36, 40, 44, 46, is adapted for autonomously transmitting to and/or receiving from the satellite in line of sight, here satellite 18, radiocommunication signals on a backward uplink 108 and/or a forward downlink 110. Thus, communication service terminal 48 is adapted for transmitting and/or receiving radio signals to and/or from satellite 18 via repeater 104.

Herein, the constellation 22 of satellites 16, 18, 20 is e.g. a constellation of the Sycomores type consisting of three satellites 16, 18, 20 following inclined and mutually phase-shifted orbits so that one satellite in turn is located is in line of sight of a terrestrial coverage area from which, at any point of the area, the satellite is seen at a high guaranteed minimum elevation angle. This kind of constellation is particularly suited for a regional coverage area located in latitudes of temperate areas, e.g. in the latitudes of the Northern hemisphere neighboring +45 degrees corresponding to Europe. A constellation of the Sycomores type is described in the article by D. Rouffet et al., under the title "A new concept for land mobile satellite communications", Satellite Systems for mobile communication and navigation, 1988, Fourth International Conference IEEE, pages 138-142.

Alternatively, the orbit of the satellite(s) is included in the group of geostationary orbits (GEO), highly elliptical orbits (HEO) of the Toundra or Molnya type, and inclined geosynchronous orbits (IGSO), and more generally any orbit which can be used for a satellite telecommunication system.

According to FIG. 1, satellite 18, which is in line of sight with the mobile communication service terminals, includes an antenna array 120 for transmitting and/or receiving radio signals received and/or transmitted by the mobile communication service terminals, and one or two transmitting and/or receiving antennas 122 used for redirecting the signals received by the antenna array 120 to the access station 24 on the backward downlink 26 and redirecting the radio signals transmitted by the terrestrial infrastructure 14 and intended for the service terminals to the service terminals on the forward uplink 28.

The antenna array 120 consists for instance of an transmitting antenna 124 and a receiving antenna 126, the transmitting antenna 124 being an active antenna having a fixed radiation pattern with respect to a supporting structure of the transmitting antenna 124, the receiving antenna 126 also being an active antenna having a fixed radiation pattern with respect to a structure of the receiving antenna.

The transmitting antenna 124 or the receiving antenna 126, each include a distinct inclination means 128, 129 for the misalignment of the antenna structure depending on a predetermined control associated with each of the active antennas 124, 126.

Alternatively, the patterns of the active antennas can be modified by changes of the gain and/or phase-shift coefficients of radiating elements composing the active antennas 124, 126.

Alternatively, a single supporting structure of the active transmitting and receiving antennas and a single misalignment mechanism shared by both antennas are provided.

Alternatively, the active transmitting and receiving antennas 124, 126 form a single antenna having common bi-band radiating elements.

The antenna array 120 in the transmitting component thereof is adapted for transmitting radio signals to the service terminals on forward satellite downlinks, the radio signals being distributed over the radiocommunication satellite beams, with only three satellite beams 130, 132, 134 being represented in FIG. 1 for simplification.

Each satellite beam 130, 132, 134 is associated with a frequency sub-band and defines by the ground radio range thereof respective satellite coverage of a satellite umbrella cell 136, 138, 140 as represented in solid lines.

Other satellite cells 142, 144, 146 are represented by way of example in which no service terminal is represented, just like satellite cell 140, so as not to crowd the figure.

According to FIG. 1, which represents an instant view of the satellite beam coverage of satellite 18 in line of sight, the satellite umbrella cell 136 covers the terrestrial cells 76, 78, 80 respectively associated with base stations 6, 8, 10 and service terminal 36 out of range of any base station.

The satellite umbrella cell 138 covers the terrestrial cell 82, the service terminals 40, 44, 46 out of range of any base station, and the FEMTO-type cell 106 containing the repeater 104 and the service terminal 48.

The terrestrial infrastructure 14 includes a network backbone 148, e.g. of the Internet type, connecting links 150 linking each base station 6, 8, 10, 12 to the network backbone 148, and a connecting link 152 from the satellite access station 24 to the network backbone 148.

The transmission resource assigning means 50 are connected to the network backbone 148 and are adapted for assigning transmission resources to each base station 6, 8, 10, 12, or each satellite beam 130, 132, 134 via a link—a satellite link or not—not shown in FIG. 1.

Each transmission resource is defined by a frequency sub-band and/or a time slot and/or a code, assigned to base stations 6, 8, 10, 12, or satellite beams 130, 132, 134, the sub-bands being determined with respect to a first frequency band allocated to the set of base stations 6, 8, 10, 12 and to a second frequency band allocated to satellite beams 130, 132, 134.

Herein, the same frequency band is shared by the base stations 6, 8, 10, 12 and the satellite 18.

Alternatively, the first allocated band of terrestrial frequencies and the second allocated band of satellite frequencies are identical, partially identical, or distinct.

The contours of the satellite cells 136, 138, 140 have been determined for the base stations 6, 8, 10, 12 to be distributed so as to be distinguishable by satellite cell 136, 138 according to a time-invariant distribution function.

The coverage of a satellite cell is said to be congruent with a predetermined coverage set of terrestrial cells when said predetermined coverage set is entirely included in the satellite coverage, i.e. the borders of the terrestrial cells distributed over the satellite cell according to the predetermined distribution function are surrounded by the border of the corresponding satellite cell.

The congruence maintaining means 52 are adapted for maintaining coverage of each forward downlink satellite cell with respect to coverage of the forward downlink terrestrial cells associated with the base stations contained in said satellite cell.

The congruence maintaining means 52 in the forward service downlink include the calibration terminals 162, 164, 166 distributed over the satellite cells 130, 132, 134, means 170 for redirecting measurements of the calibration terminals 162, 164, 166, a means 172 for processing calibration measurements transmitted by the calibration terminals for developing correcting controls, a remote control satellite station 174 connected to the processing means 172 forming a means 174 for redirecting correcting controls to the satellite 18, a mechanism 176 for correcting the transmission radiation pattern of satellite 18, here the inclination mechanism 128 of the support of the active transmitting antenna 124.

The calibration terminals 162, 164, 166 can be classified into three types of terminals, the terminals of the first type 162 each arranged at a different base station, the terminals of the second type arranged at a repeater of a FEMTO-type cell, and the terminals of the third type integrated into the service terminals operating in satellite mode.

A terminal of the first type 162 is here arranged at each base station 6, 8, 10, 12 while being adapted for receiving the calibration signals on an associated forward satellite downlink 182, 184, 186, 188 and returning the measurement, e.g. by means of the associated base station 6, 8, 10, 12, under proper conditions of propagation.

A terminal of the second type 164 is arranged at the repeater 104 of building 106 while being adapted for receiving a calibration signal from the satellite 18 on a forward downlink 190 and sending the result of the measurements via a backward satellite uplink 192 from satellite 18, and a backward satellite downlink 194.

A distinct calibration terminal 166 is integrated into each service terminal 36, 40, 44, 46 while being adapted for receiving the calibration signals on an associated forward satellite downlink 196, 198, 200, 202 and sending the results of the measurements via an associated backward satellite uplink 204, 206, 208, 210 from satellite 18, and the backward satellite downlink 194, under proper conditions of propagation.

The backward satellite uplinks 192, 204, 206, 208, 210, satellite 18, and backward downlink 194 are also adapted for directing the position of their associated calibration terminal to the satellite access station 24.

Each calibration terminal 162, 164, 166 comprises a satellite receiving antenna 212, and a radio power measuring means.

The satellite receiving antenna 212 is configured to have a substantially omnidirectional radiation pattern at a solid angle corresponding to the set of elevations observed while going through the coverage set of the satellite beams and depending on the type of orbit the satellite is following.

E.g., herein the receiving antenna 212 of any calibration terminal simply has a hemispherical omnidirectional pattern.

The radio power measuring means is adapted for measuring the power of a forward satellite downlink radio signal specific to the calibration or power of a forward satellite downlink radiocommunication signal, with the resolution of the power measurement being less than 1 dB and precision of the measurement being less than 5 dB, and a means for forwarding the measurements collected by the measuring means, and the positions of the calibration terminals in case the positions of said calibration terminals are not predetermined.

The means 170 for redirecting the measurements include satellite links 192, 194, 198, 204, 208, 210, connecting station 24, network backbone 148, connecting links 150, 152, and a link 213 connecting the processing unit 172 to the network backbone 148.

The processing means 172 is adapted for receiving via redirecting means 170 the power measurement information associated with each calibration terminal 162, 164, 166 and for determining from of an expected ground receiving satellite radiation pattern an estimated angle for misalignment correction, shared by the beam set.

The precision of the estimate of the required correction depends both on the total number of calibration terminals 162, 164, 166 in all of the satellite beams 130, 132, 134 and/or on the distribution of the calibration terminals by satellite beam, the measurement precision of the power measuring means, the transmitting and/or reception radiation patterns of the antennas 212 of the calibration terminals.

The processing means 172 is adapted for providing a control to correct the satellite beams by a local estimate per beam, a sufficient number of calibration terminals being provided in each beam, or by a overall estimate integrating all of the calibration terminals into a single radiation pattern merging several beams, an estimate being included in the group of methods consisting of the least square method and correlation methods, e.g. the so-called MinMax method, or pattern inversion.

Alternatively, the processing means 172 is adapted for determining a correction of satellite beam formation.

Alternatively, the processing means 172 is carried on board the satellite.

The number of calibration terminals 162, 164, 166 is greater than or equal to 50 so that the statistical size is sufficient for estimating with sufficient precision the correction to be applied to the pattern of the transmitting antenna for maintaining congruence between satellite beams and terrestrial cells.

Preferably, the number of calibration terminals is a number between 100 and 200.

The effect of the statistical size allows to eliminate the need to use calibration stations which are complex due to the antennas thereof, the patterns of which are highly directional, and due to the respective positioning thereof which must strictly match the expected intersections of the satellite beam orbital tracks, which results in difficulties of installation, e.g. in terms of relief or climate.

The processing means is adapted for developing a control for maintaining congruence from a previously known response function of the transmitting antenna 124 and the correcting mechanism 128.

The remote control station 174 is adapted for sending the control to the satellite 18 via a remote control uplink 220.

Herein, the transmitting antenna 124 of satellite 18 is configured so that the beam corresponding of each satellite beam 130, 132, 134 has a characteristic aperture angle $\theta$ of less than 0.15 degrees.

Alternatively, the characteristic aperture angle $\theta$ is less than a number between 0.5 degrees and several degrees.

The characteristic angle $\theta$ is defined as the minimum aperture angle selected from the set of azimuth directions of the beam with respect to a transmission phase plane of the transmitting antenna 124 of satellite 18.

The different means forming the congruence maintaining means 52 are arranged so that the misalignment of any satellite beam $\Delta\theta$ is permanently maintained at less than 0.012 degrees.

Preferably, the misalignment of any satellite beam $\Delta\theta$ is permanently maintained below a value between 0.02 and 0.05 degrees.

Figure 2:
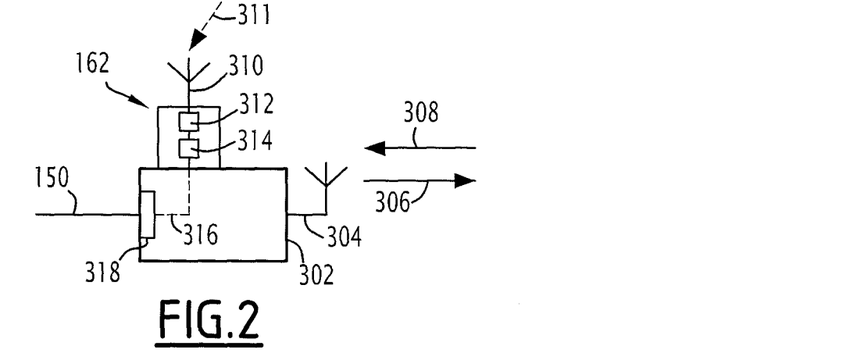
FIG. 2 is a view of a calibration terminal intended for calibrating the forward satellite downlink and arranged at a base station.

According to FIG. 2, a calibration terminal of the first type 162 is arranged at a base station designated by the generic reference 302.

The base station 302 comprises a radiocommunication antenna 304 adapted for transmitting and receiving radiocommunication signals via a backward terrestrial uplink 306 and a forward terrestrial downlink 308 represented by two solid arrows.

The calibration terminal of the first type 162 includes the satellite receiving antenna 212 adapted for receiving a radio calibration signal via a forward radio downlink 311, a radio power measuring means 312 connected to the antenna, and an emitter 314 adapted for sending the measuring information provided by the measuring means 312 to the processing means 172 via a terrestrial link 316 for connection to the base station 302 and an interface 318 for sending the calibration measurement to the processing unit 152.

Figure 3:
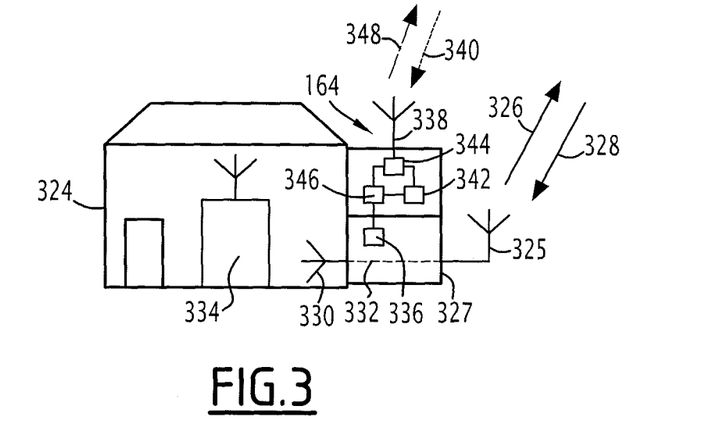
FIG. 3 is a view of a calibration terminal intended for calibrating the forward satellite downlink and arranged at a FEMTO-type station.

According to FIG. 3, a calibration terminal of the second type 164 is arranged at a repeater 322 of a so-called FEMTO cell intended to facilitate radio wave propagation inside a building 324 out of range of a base station.

The repeater 322 includes an outside antenna 325 adapted for communicating with satellite 18 via uplinks and downlinks 326, 328, an inside antenna 330 situated inside the building 324 and connected to the outside antenna 325 by a transparent link 332, possibly with amplification. The inside antenna 330 is adapted for improving communication with a mobile communication service terminal 334 situated inside the building 324.

The repeater 324 also includes a locating unit 336, e.g. of GPS (Global Positioning System) type.

The calibration terminal of the second type 164 includes the satellite receiving antenna 338 adapted for receiving a radio calibration signal via radio link 340, a radio power measuring means 342 connected to the satellite receiving antenna 338 via a transmitting-receiving duplexer 344, an emitter 346 adapted for collecting the radio field measurement information and the locating information of the calibration terminal and for forwarding all information to satellite 18 via duplexer 344, antenna 338, and a backward radio signaling satellite uplink 348.

Figure 4:
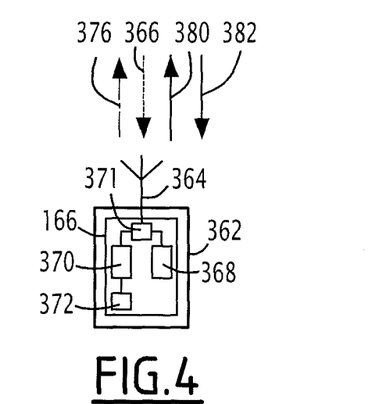
FIG. 4 is a view of a calibration terminal intended for calibrating the forward satellite downlink and integrated into a mobile communication service terminal.

According to FIG. 4, a calibration terminal of the third type 166 is a mobile communication service terminal 362 including in common the satellite receiving antenna 364 adapted for receiving a radio calibration signal via a radio downlink 366.

The calibration terminal 360 includes a radio power measuring means 368 connected to the satellite receiving antenna 364 via a transmitting-receiving duplexer 370, a locating means 372, and an emitter 374 adapted for collecting radio field measurement information, and locating information of the calibration terminal, and for forwarding all information to satellite 18 via duplexer 370, antenna 364, and a backward signaling radio satellite uplink 376.

E.g., the locating means 372 is formed by position information extracting means determined by a terrestrial processing unit using for instance a triangulation method of a terrestrial network.

Herein, the calibration uplinks 366, 376 for measuring and downlinks for signaling, shown in dashed lines, are different from the service uplink 380 and the service downlink 382 shown in solid lines.

Alternatively, the locating means 372 is a global positioning receiver by means of a satellite constellation, e.g. GPS.

Alternatively, the service uplink 380 and the calibrating uplink 376 corresponding to the path for directing locating information of the calibration terminal are identical. The service downlink 382 and the calibration downlink 382 are also identical. The radio power measuring means 368, the transmitting-receiving duplexer 370, the emitter 374 used for calibration, are the same components as those used for the terrestrial links.

Figure 5:
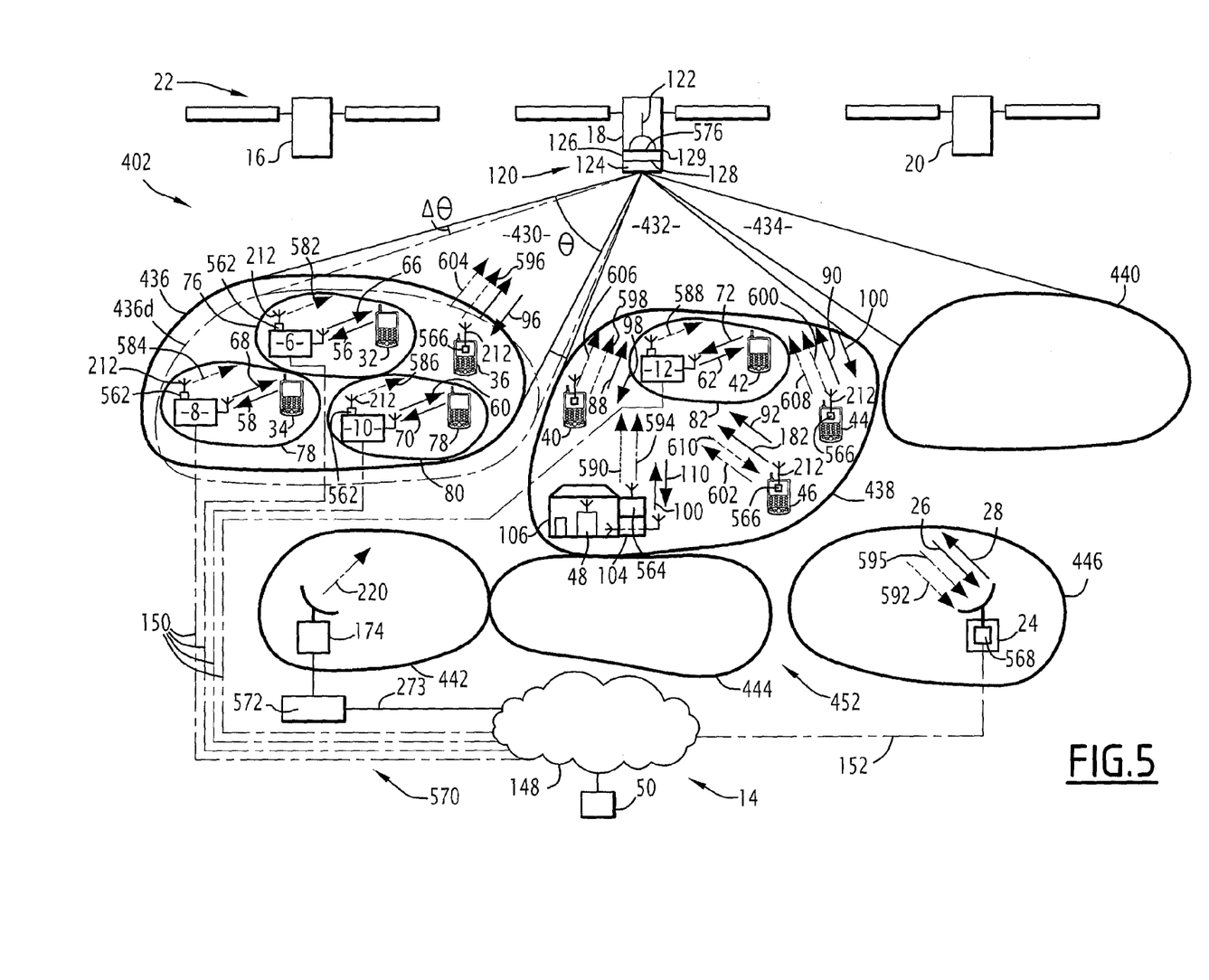
FIG. 5 is a view of a hybrid telecommunication system according to the invention allowing for congruence to be maintained on the backward uplink of satellite beams with respect to the terrestrial cells.

According to FIG. 5, the hybrid telecommunication system 402 is identical in terms of telecommunication service to the hybrid telecommunication system 2 described in FIG. 1, and is different therefrom only in that the means for maintaining congruence are herein provided for maintaining congruence between the backward uplink satellite beams and the corresponding terrestrial cells on the links in the same direction.

The references of the base stations, the satellites, the access station from the satellite to the terrestrial infrastructure, the communication service terminals, the forward terrestrial service downlinks, the backward terrestrial service uplinks, the terrestrial cells, the satellite antennas, and the means for correcting the misalignment of the antennas are the same as in FIG. 1.

According to FIG. 5, the satellite beams of the backward uplinks are shown.

The antenna array 120 in the receiving component thereof, i.e. the active receiving antenna 126, is adapted for receiving radio signals on forward satellite uplinks from the service terminals, the radio signals being distributed over the radio-communication satellite beams, only three satellite beams 430, 432, 434 being shown in FIG. 5 for simplification.

Each satellite beam 430, 432, 434 is associated with a frequency sub-band and defines by the ground radio range thereof a respective satellite coverage of a satellite umbrella cell 436, 438, 440 shown in solid lines.

Other satellite cells 442, 444, 446 are shown by way of example with no service terminal being shown therein, just like satellite cell 440, so as not to crowd the figure.

According to FIG. 5 which shows an instant view of the forward uplink satellite beam coverage of the satellite 18 in line of sight, the satellite umbrella cell 436 covers the terrestrial cells 76, 78, 80 respectively associated with the base stations 6, 8, 10 and the service terminal 36 out of range of any base station.

The satellite umbrella cell 438 covers the terrestrial cell 82, the service terminals 40, 44, 46, out of range of any base station, and the FEMTO-type cell 106 containing the repeater 104 and the service terminal 48.

The means 50 for assigning transmission resources are connected to the network backbone 148 and are adapted for assigning transmission resources to each base station 6, 8, 10, 12, or each satellite beam 430, 432, 434.

Each transmission resource is defined by a frequency sub-band and/or a time slice and/or a code, assigned to the base stations or satellite beams, 430, 432, 434, the sub-bands being determined with respect to a first frequency band assigned to the set of base stations 6, 8, 10, 12 and a second frequency band assigned to the satellite beams 430, 432, 434.

Herein, the same frequency band is shared by base stations 6, 8, 10, 12 and satellite 18.

Alternatively, the first allocated band of terrestrial frequencies and the second allocated band of satellite frequencies are identical, partially identical, or distinct.

The contours of the satellite cells 436, 438, 440 have been determined for the base stations 6, 8, 10, 12 to be distributed so as to be distinguishable by uplink satellite cell according to a time-invariant distribution function.

The coverage of a satellite cell is said to be congruent for backward uplinks with a predetermined coverage set of terrestrial cells of links in the same direction when said predetermined coverage set is entirely included in the satellite coverage, i.e. the borders of the terrestrial cells distributed over the satellite cell according to the predetermined distribution function are surrounded by the border of the corresponding satellite cell.

The congruence maintaining means 452 are adapted for maintaining the coverage of each backward uplink satellite cell with respect to the coverage of the terrestrial cells of links in the same direction and associated with the base stations contained in said satellite cell.

The congruence maintaining means 452 in backward service uplink include calibration terminals 562, 564, 566 distributed over the satellite cells 436, 438, 440, measuring means 568 of the radio signals received by the satellite 18 from the calibration terminals 562, 564, 566, and means 570 for redirecting the measurements provided by the measuring means 568 to a processing means 572, the means 572 for processing the calibration measurements provided by the measuring means 568 for developing correction controls, the remote control satellite station 174 connected to the processing means 572 forming the means for redirecting correcting controls to the satellite 18, a mechanism 576 for correcting the reception radiation pattern of the receiving antenna 126 of satellite 18, here the mechanism 129 for inclining the support of the active receiving antenna 126.

The calibration terminals 562, 564, 566 can be classified in three types of terminals, terminals of the first type 562 each being arranged at a different base station, terminals of the second type being arranged at a repeater of a FEMTO-type cell, and terminals of the third type being integrated into the service terminals operating in satellite mode.

Herein, a terminal of the first type 562 is arranged at each base station 6, 8, 10, 12 while being adapted for transmitting power-calibrated calibration signals under proper conditions of propagation, and wherein an identifier of the base station 6, 8, 10, 12 is coded with which the emitter terminal 562 is associated on an associated backward satellite uplink 582, 584, 586, 588.

A terminal of the second type 564 is arranged at the repeater 104 of the building 106 while being adapted for transmitting a calibration signal to the satellite 18 on a backward uplink 590, the calibration signal being intended to be redirected transparently by the satellite 18 to the access station 24 via a backward satellite downlink 592.

The second-type terminal 564 is also adapted for transmitting a terminal locating signal to the access station 24 via a signaling uplink 594 of satellite 18 and a signaling downlink 595.

A distinct calibration terminal 566 is integrated into each service terminal 36, 40, 44, 46 while being adapted for transmitting calibration signals on an associated backward satellite uplink 596, 598, 600, 602 under proper conditions of propagation, the calibration signals being intended to be redirected transparently by the satellite 18 to the access station 24 via the backward satellite downlink 592, and the respective identifier of the associated emitter terminal 566 being coded therein.

Each calibration terminal 566 respectively associated with a service terminal 36, 40, 44, 46 is adapted for also transmitting a terminal locating signal to the access station 24 via an associated signaling uplink 604, 606, 608, 610 of satellite 18 and the signaling downlink 595.

Each calibration terminal 562, 564, 566 comprises a satellite transmitting antenna, herein assumed to be the same as the receiving antenna 212 of the calibration terminals described in FIG. 1, and a means for generating a radio signal the transmitting power of which is known exactly.

Just like the receiving antenna of FIG. 1, the transmitting antenna 212 is configured to have a substantially omnidirectional radiation pattern at a solid angle corresponding to the set of elevations observed when going through the coverage set of the satellite beams and depending on the type of orbit the satellite is following.

E.g., herein, the transmitting antenna 212 of any calibration terminal simply has a hemispherical omnidirectional pattern.

The measuring means 568 of the calibration signals is then arranged in the access station 24, assuming that the damping characteristics of the satellite uplinks 582, 584, 586, 588, 590, 596, 598, 600, 602, and the downlink 592 are known exactly, as well as the gain characteristic of satellite 18 operating like a transparent repeater.

The measurement redirecting means 570 include the connecting station 24, the network backbone 148, and the connecting links 152, 154.

Alternatively, the measuring means 568 is arranged aboard satellite 18, and the redirecting means then moreover include the satellite downlink 592.

The processing means 572 is adapted for receiving via the redirecting means 570 the power measurement information associated with each calibration terminal 562, 564, 566 at satellite 18 and determining, from of an uplink receiving satellite radiation pattern observed on the ground and expected, a misalignment correcting angle common to the set of beams.

Alternatively, the processing means 572 is adapted for determining a correction of the satellite beam formation.

Alternatively, the processing means 572 is on board the satellite.

The number of calibration terminals 562, 564, 566 is greater than or equal to 50 so that the statistical size is sufficient for a sufficiently precise estimate of the correction to be applied to the pattern of the receiving antenna for maintaining congruence between the uplink satellite beams and the terrestrial cells of the terrestrial uplink.

Preferably, the number of calibration terminals is a number between 100 and 200.

The effect of the statistical size allows to eliminate the need to use calibration stations which are complex due to the antennas thereof, the patterns of which are highly directional, and due to the respective positioning thereof which must strictly match the expected intersections of the satellite beam orbital tracks, which results in difficulties of installation, e.g. in terms of relief or climate.

The processing means 572 is adapted for developing a congruence maintaining control from a correcting mechanism response function known in advance.

The remote control station 174, just like that of FIG. 1, is adapted for sending the control to satellite 18 via remote control uplink 220.

Herein, the receiving antenna 126 of the satellite is configured so that the corresponding beam of each satellite cell has a characteristic aperture angle $\theta$ of less than 0.15 degrees.

Alternatively, the characteristic aperture angle $\theta$ is less than a number between 0.5 degrees and several degrees.

The characteristic angle $\theta$ is defined as the minimum aperture angle taken from the set of azimuth directions of the beam with respect to a receiving phase plane of the receiving antenna 126 of satellite 18.

The different means forming the congruence maintaining means 452 are arranged so that the misalignment of any satellite beam is permanently maintained to be less than an angle difference $\Delta\theta$ of 0.012 degrees.

Preferably, the misalignment of any satellite beam $\Delta\theta$ is maintained to be permanently less than a value between 0.02 and 0.05 degrees.

Figure 6:
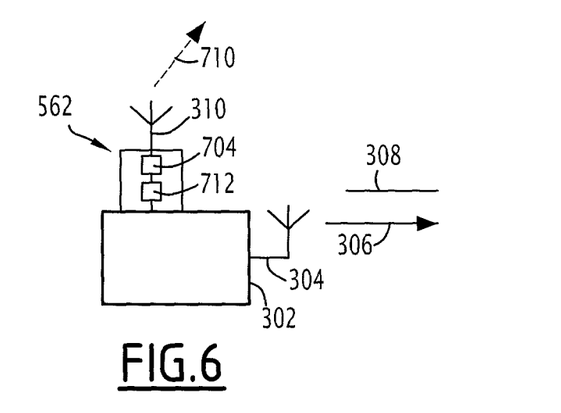
FIG. 6 is a view of a calibration terminal intended for calibrating the backward satellite uplink and arranged at a base station.

According to FIG. 6, a calibration terminal of the first type 562 is arranged at a base station 302 identical to that described in FIG. 2.

Just like FIG. 2, the base station 302 has a radiocommunication antenna 304 adapted for transmitting and receiving radiocommunication signals via a backward terrestrial uplink 306 and a forward terrestrial downlink 308 represented by two solid arrows.

The calibration terminal of the first type 562 includes the satellite transmitting antenna 310, identical to the receiving antenna of FIG. 2, adapted for transmitting a radio calibration signal via radio link 710, a means for generating a calibration signal 712 the power of which is known exactly, a modulator 714 for coding an identifier of base station 302 where the calibration terminal is arranged.

Figure 7:
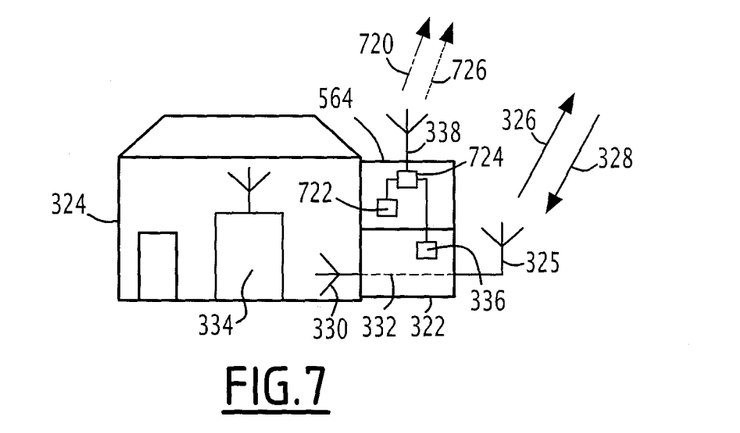
FIG. 7 is a view of a calibration terminal intended for calibrating the backward satellite uplink and arranged at a FEMTO-type repeater.

According to FIG. 7, a calibration terminal of the second type 564 is just like FIG. 3 arranged at the repeater 322 of the so-called FEMTO cell so as to improve the propagation of radio waves inside the building 324 out of range of a base station.

The repeater 322 includes the same components 325, 330, 332, 336 as those described in FIG. 3 and the same uplinks and downlinks 326, 328.

The calibration terminal of the second type 564 includes the satellite transmitting antenna 338, identical to the receiving antenna of FIG. 3, adapted for transmitting a radio calibration signal via a radio link 720, a means for generating a calibration signal 722 the power of which is known exactly, an output duplexer/modulator 724, connected as a first input to the locating means 336 and as a second input to the generating means 722, adapted for modulating the locating information on a characteristic carrier of a signaling uplink 726 other than the carrier associated with the calibration signal, and for frequency duplexing the calibration signal and modulated locating signal.

Figure 8:
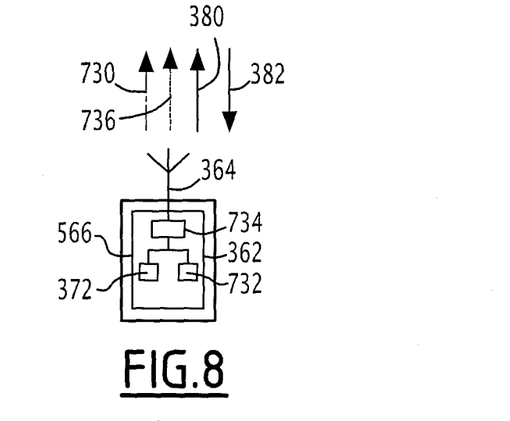
FIG. 8 is a view of a calibration terminal intended for calibrating the backward satellite uplink and integrated into a mobile communication service terminal.

According to FIG. 8, a calibration terminal of the third type 566 is a mobile communication service terminal 362 having in common the satellite transmitting antenna 364, identical with the receiving antenna of FIG. 4 and adapted for transmitting a radio calibration signal via a radio uplink 730.

The calibration terminal of the third type 566 also includes a means 732 for generating a calibration signal the power of which is known exactly, an output duplexer/modulator 734, connected as a first input to the locating means 336 identical to that of FIG. 4, and as a second input to the generating means 732, adapted for modulating the locating information on a carrier characteristic of a signaling uplink 736 other than the carrier associated with the calibration signal, and frequency duplexing the calibration signal and the modulated locating signal.

Herein, the calibrating and signaling uplinks 730, 736 shown in dashed lines are different from each other and from the service uplink 380 shown in solid lines.

Alternatively, the calibrating and signaling uplinks 730, 736 are shared, e.g. by modulating the locating information on the carrier calibration signal.

Alternatively, the calibrating and signaling uplinks 730, 736 and the service uplink 380 are shared, by using the signal or a portion thereof as a calibration signal and the service signal as a signaling signal.

The generating means 732 of the calibration signal can be a conventional means implemented for an already existing power control function.

Figure 9:
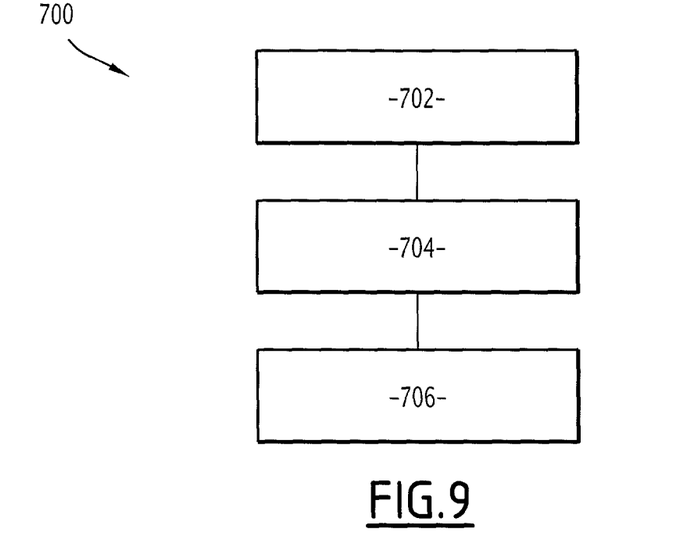
FIG. 9 is a flow chart of a method for maintaining the congruence of terrestrial cell coverage of a cellular radiocommunication network with satellite coverage acting as an umbrella of at least one satellite.

According to FIG. 9, a congruence maintaining method 700 between terrestrial cell coverage on links in the same direction of a cellular radiocommunication network and satellite cell coverage corresponding to the links in the same direction as the links of the terrestrial cells and acting as umbrella cells, is implemented in a hybrid telecommunication system as described in FIGS. 1 and 5, and includes a series of steps 702, 704, 706.

In the first step 702, power of calibration radio signals is measured either by the calibration terminals operating as receivers on a forward downlink, or by measuring means located aboard satellite 18 or an access station 24 on a backward uplink.

The calibration radio signals are transmitted either by the satellite on a forward downlink, or by the calibration terminals operating as an emitter on a backward uplink.

Then, during the same step 702, the measurements are redirected to the processing means 172, 572.

In the next step 704, the processing means 172, 571 estimates the corrections required in terms of misalignment angle on the overall antenna structure of the antenna, or of gain/phase shift coefficients of radiating elements so as to ensure congruence of each satellite beam.

In step 704, an overall estimate is implemented by integrating all of the calibration terminals into a single radiation pattern merging several beams.

The estimate is done according to a method selected from the least square method and correlation methods.

The precision of the estimate of the required correction depends both on the total number of calibration terminals in all of the satellite beams and/or the distribution of the calibration terminals per satellite beam, the measurement precision of the power measuring means, the transmission and/or reception radiation patterns of the antennas of the calibration terminals, and also the level of congruence desired between satellite beams, as well as the desired pointing stability.

In step 706, the correction estimated in step 704 is applied to the correcting mechanism 128, 129 of the satellite beams.

Figure 10:
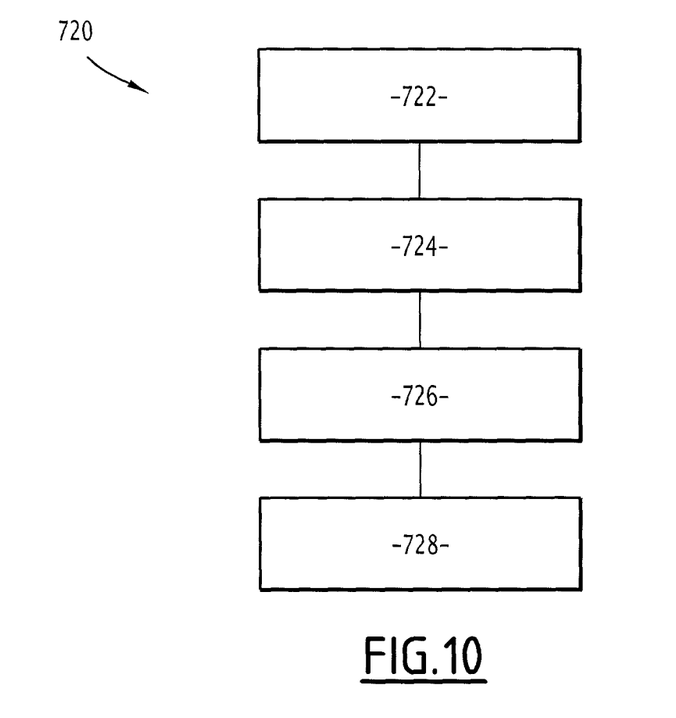
FIG. 10 is a flow chart of a variant of the maintaining method described in FIG. 3.

According to FIG. 10, a variant of the method described in FIG. 9 includes a series of steps 722, 724, 726, 728.

The first step 722 is similar to step 702 and different therefrom in that a sufficient number of calibration terminals have been provided in each satellite beam so as to perform processing per beam.

In step 724, the measurement data is classified per beam.

In the same step 724 for each beam, the processing means estimates the corrections associated with a beam required in terms of misalignment angle on the overall antenna structure of the antenna or the local structures of the antenna, or gain/phase shift coefficients of the radiating elements so as to ensure congruence for the analyzed beam.

Then, in the next step 726, the processing unit synthesizes the estimated corrections for each beam in step 724 into a correction giving the best overall compromise of congruence for the beam set.

In step 728, the correction synthesized in step 726 is applied to the correcting mechanism 128, 129 of the satellite beams.

This will result in congruence to be maintained between the satellite beams and the terrestrial cells for links in the same direction.

The invention described above for a hybrid system is also applicable to a non-hybrid satellite system, i.e. a single satellite system with a large number of service terminals and satellite cells but without a network of terrestrial cells.

A non-hybrid radiocommunication satellite system includes at least one communication satellite, connected to a terrestrial infrastructure by at least one access station via a bidirectional junction link, and adapted for transmitting on a forward satellite downlink and/or receiving on a backward satellite uplink service radiocommunication signals distributed over the radiocommunication satellite beams, with the satellite beams each being associated with a frequency sub-band and each defining by the ground radio range thereof satellite coverage of a satellite cell.

The non-hybrid radiocommunication satellite system also includes a set of communication service terminals adapted for transmitting and/or receiving the radiocommunication signals, and distributed over the satellite cells, means for assigning transmitting resources to the satellite beams, with each resource being defined by a frequency sub-band and/or a time slice and/or a code, the sub-bands being determined with respect to a frequency band allocated to the satellite beams.

The non-hybrid radiocommunication satellite system also includes means for permanently maintaining congruence of the coverage of each satellite cell with respect to an associated minimum coverage template desired for a satellite cell.

In a non-hybrid satellite system, coverage of a satellite cell is congruent with respect to a desired associated minimum coverage template when the desired associated minimum coverage template is entirely included in the satellite coverage.

According to the special modes, the corresponding satellite beam of each satellite cell has a characteristic aperture angle $\theta$ defined as the minimum aperture angle selected from the set of azimuth directions of the satellite beam with respect to a transmission or reception phase plane of the satellite.

The minimum aperture angle $\theta$ of the corresponding beam of each satellite cell is less than an angle value between 0.5 degrees and several degrees, and the congruence maintaining means are adapted for maintaining misalignment $\Delta\theta$ of the satellite beam permanently at less than 0.05 degrees.

The orbits of the satellites of the non-hybrid system are the same as those used for a hybrid system.

Just like a hybrid system, the congruence maintaining means include calibration terminals distributed over the satellite cells, and each one includes a satellite receiving antenna, the satellite receiving antenna having a substantially omnidirectional radiation pattern at a solid angle, corresponding to the set of elevations observed when going through the satellite coverage set and depending on the type of orbit the satellite is following.

Each calibration terminal includes a radio power measuring means adapted for measuring the power of a downlink radio signal specific to the calibration or power of a radiocommunication signal, with the resolution of the power measurement being less than 1 dB and precision of the measurement being less than 5 dB, and a means for forwarding the measurements collected by the measuring means and the positions of the calibration terminals in case they are not predetermined.

The congruence maintaining means include calibration terminals distributed over the satellite cells, and each one includes a satellite transmitting antenna, the satellite transmitting antenna having a substantially omnidirectional radiation pattern at a solid angle, corresponding to the set of elevations observed while going through the satellite coverage set and depending on the type of orbit the satellite is following, each calibration terminal having a means for transmitting a radio signal on an upward satellite link specific to the calibration or power-calibrated radiocommunication, and a measuring means located aboard the satellite or an access station adapted for measuring the power of the calibration radio signal of each calibration terminal on the corresponding backward satellite uplink, with the resolution of the power measurement being less than 1 dB and precision of the measurement being less than 5 dB, and a means for forwarding the measurements collected by the measuring means and the positions of the calibration terminals in case they are not predetermined.

In the non-hybrid system, the number of calibration terminals is greater than or equal to 50.

The calibration terminals are arranged at a number of fixed communication service terminals the location of which is known exactly.

A number of calibration terminals are arranged on FEMTO-type repeaters intended for improving wave propagation inside buildings, each repeater being provided with a locating unit, the calibration terminal being adapted for transmitting the location thereof through the locating information provided by the locating unit.

The calibration terminals are mobile communication service terminals including a locating means selected from the set consisting of global positioning receivers via a constellation of satellites, and the positioning information extracting means determined by a mobile terrestrial network, the calibration terminal being adapted for transmitting the location thereof through the locating information provided by the locating means.

The non-hybrid satellite communication system includes a processing means adapted for receiving the power measurement information associated with each calibration terminal and for determining from of an expected ground radiation pattern a misalignment correcting angle common to the beam set or a correction of the satellite beam formation, the processing means being connected to the measurement means by one or several communication links from links of a Internet-like ground network, links of a terrestrial cellular network, and satellite links.

The precision of the estimate of the required correction depends both on the total number of calibration terminals in all of the satellite beams and/or on the distribution of the calibration terminals by satellite beam, the measurement precision of the power measuring means, the transmission and/or reception radiation patterns of the antennas of the calibration terminals.

The processing means is adapted for correcting the satellite beams by a local estimate per beam, with a sufficient number of calibration terminals being provided in each beam, or an overall estimate integrating all of the calibration terminals into a single radiation pattern merging several beams, an estimate being included in the group of methods consisting of the least square method and correlation methods.

A method for maintaining congruence between satellite cell coverage and the desired coverage created by a satellite in a non-hybrid satellite telecommunication system as described above includes the following steps:

power of calibration radio signals is measured either by calibration terminals operating as receivers on a forward downlink, or by measuring means located aboard a satellite or an access station on a backward uplink or backward downlink, and redirected to a processing means, the processing means estimates a correction required in terms of a misalignment angle on a satellite antenna supporting structure, or gain/phase shift coefficients of radiating elements, from the power measurements collected in the measuring step, locating information of the terminals, and time-invariant desired coverage, the condition of congruence being met for each satellite cell when the coverage of each satellite cell contains the associated desired coverage, the correction estimated in the estimating step is applied to the correcting mechanism of the satellite beams.

What is claimed is:

1. A hybrid cellular radiocommunication system, comprising:
    a network of terrestrial base stations interconnected together and linked to a terrestrial infrastructure, each terrestrial base station adapted, in an associated frequency sub-band, for transmitting on a forward downlink and/or receiving on a backward uplink service radiocommunication signals, and each defining by a radio range thereof upward and/or downward coverage of a terrestrial radiocommunication cell;
    at least one communication satellite, linked to the terrestrial infrastructure by at least one access station via a bidirectional junction link, and adapted for transmitting on a forward satellite downlink and/or receiving on a backward satellite uplink service radiocommunication signals distributed over radiocommunication satellite beams, the satellite beams each being associated with a frequency band and each defining by the radio range thereof up and/or down satellite coverage of a satellite umbrella cell of a plurality of satellite cells,
    a set of communication service terminals adapted for transmitting and/or receiving the radiocommunication signals, and distributed over the terrestrial cells and the satellite cells,
    means for assigning transmission resources, each being defined by a frequency sub-band and/or a time slot and/or a code, to the base stations or satellite beams, with the sub-bands being determined with respect to a first frequency band allocated to a set of base stations and a second frequency band allocated to the satellite beams,
    the base stations being distributed so as to be distinguishable by satellite cell according to a time-invariant distribution function,
    a congruence maintaining means, permanently and in a same link direction, of the coverage of each satellite cell with respect to the coverage of the terrestrial cells associated with the base stations contained in the satellite cell, coverage of a satellite cell being congruent with a predetermined terrestrial coverage set when the predetermined coverage set is entirely included in the satellite coverage.

2. The hybrid communication system according to claim 1, wherein the same frequency band is shared by the base stations and the satellite.

3. The hybrid communication system according to claim 1, wherein the corresponding satellite beam of each satellite cell has a characteristic aperture angle $\theta$ defined as a minimum aperture angle selected from a set of azimuth directions of the beam with respect to a transmission or reception phase plane of the satellite, and in that the minimum aperture angle $\theta$ of the corresponding beam of each satellite cell is less than an angle value between 0.5 degrees and several degrees, and in that the congruence maintaining means are adapted for maintaining misalignment $\Delta\theta$ of the satellite beam to be permanently less than 0.05 degrees.

4. The hybrid communication system according to claim 1, wherein an orbit of the satellite is included in the group of geostationary orbits (GEO), highly elliptical orbits (HEO) and inclined geosynchronous orbits (IGSO).

5. The hybrid communication system according to claim 1, wherein the congruence maintaining means includes calibration terminals, distributed over the satellite cells, and each one including a satellite receiving antenna, the satellite receiving antenna having a substantially omnidirectional radiation pattern at a solid angle, corresponding to a set of elevations observed while going through a satellite coverage set and depending on a type of orbit the satellite is following.

6. The hybrid communication system according to claim 5, wherein each calibration terminal includes a radio power measuring means adapted for measuring a power of a downlink radio signal specific to a calibration or power of a radiocommunication signal, with a resolution of the power measurement being less than 1 dB and precision of the measurement being less than 5 dB, and a means for forwarding the measurements collected by the measuring means and positions of the calibration terminals in case the positions are not predetermined.

7. The hybrid communication system according to claim 1, wherein the congruence maintaining means includes calibration terminals distributed over the satellite cells, and each comprising a satellite transmitting antenna, the satellite transmitting antenna having a substantially omnidirectional radiation pattern at a solid angle, corresponding to a set of elevations observed when going through a satellite coverage set and depending on a type of orbit the satellite is following, each calibration terminal having a means for transmitting a radio signal on a satellite uplink specific to a calibration or of power-calibrated radiocommunication, and a measuring means located aboard the satellite or the access station adapted for measuring a power of a calibration radio signal of each calibration terminal on a corresponding backward satellite uplink, with a resolution of the power measurement being less than 1 dB and precision of the measurement being less than 5 dB, and a means for forwarding the measurements collected by the measuring means and positions of the calibration terminals in case the positions are not predetermined.

8. The hybrid communication system according to claim 5, wherein a number of calibration terminals is greater than or equal to 50.

9. The hybrid communication system according to claim 5, wherein the calibration terminals are arranged at a number of base stations a location of which is known exactly.

10. The hybrid communication system according to claim 5, wherein a number of calibration terminals are arranged at FEMTO repeaters intended to improve wave propagation inside buildings, each repeater being provided with a locating unit, the calibration terminal being adapted for transmitting a location thereof through locating information provided by the locating unit.

11. The hybrid communication system according to claim 5, wherein the calibration terminals are mobile communication service terminals including a locating means selected from a set consisting of global positioning receivers via a constellation of satellites, and positioning information extracting means determined by a mobile terrestrial network, the calibration terminal being adapted for transmitting the location thereof through locating information provided by the locating means.

12. The hybrid communication system according to claim 1, further comprising a processing means adapted for receiving power measurement information associated with each calibration terminal and for determining from of an expected ground radiation pattern a misalignment correcting angle common to a beam set, or a correction of the satellite beam formation, the processing means being connected to a measuring means by one or several communication links from links of an Internet-like ground network, links of a cellular terrestrial network, and satellite links.

13. The hybrid communication system according to claim 12, wherein precision of an estimate of a required correction depends both on total number of calibration terminals in all of the satellite beams and/or distribution of the calibration terminals by satellite beam, measuring precision of power measuring means of transmission and/or reception radiation patterns of the antennas of the calibration terminals.

14. The hybrid system communication according to claim 12, wherein the processing means is adapted for correcting the satellite beams by a local estimate per beam, with a sufficient number of calibration terminals being provided in each beam, or an overall estimate integrating all of the calibration terminals into a single radiation pattern merging several beams, an estimate including the least square method or correlation methods.

15. The hybrid communication system according to claim 1, comprising at least one satellite which creates an umbrella wherein congruence between terrestrial radiocommunication cell coverage and satellite cell coverage acting as the umbrella is maintained by:
measuring a power of calibration radio signals by calibration terminals operating as receivers on a forward downlink, or by measuring means located aboard a satellite or an access station on a backward uplink, and redirected to a processing means,
estimating with a processor a required correction in terms of misalignment angle on a satellite antenna supporting structure, or gain/phase shift coefficients of radiating elements, from the power measurements collected in step and the time-invariant distribution function of the base stations in the satellite cells, the condition of congruence being met for each satellite cell when coverage of each satellite cell contains the coverage set of the terrestrial cells associated with the base stations determined by the distribution function as being included in the satellite cell,
applying the estimated correction to the correcting mechanism of the satellite beams.

16. The hybrid communication system according to claim 4, wherein the highly elliptical orbits (HEO) include Sycomores, Toundra, or Molnya type.

* * * * *